United States Patent

Sasse

[11] Patent Number: 6,070,704
[45] Date of Patent: Jun. 6, 2000

[54] TORQUE CONVERTER

[75] Inventor: Christoph Sasse, Schweinfurt, Germany

[73] Assignee: Mannesmann Sachs AG, Schweinfurt, Germany

[21] Appl. No.: 09/274,640

[22] Filed: Mar. 23, 1999

[30] Foreign Application Priority Data

Mar. 23, 1998 [DE] Germany .......................... 198 12 687

[51] Int. Cl.[7] .................................................. F16D 33/00
[52] U.S. Cl. ........................... 192/3.28; 74/574; 192/3.29
[58] Field of Search ................................. 192/3.28, 3.29, 192/3.3, 3.31; 74/574

[56] References Cited

U.S. PATENT DOCUMENTS 4,437,551  3/1984  Gimmler et al. ...................... 192/3.28
5,186,292  2/1993  Hageman et al. ..................... 192/3.28

FOREIGN PATENT DOCUMENTS 195 14 411  11/1995  Germany ......................... F16D 33/00

*Primary Examiner*—Charles A Marmor
*Assistant Examiner*—Tisha D. Waddell
*Attorney, Agent, or Firm*—Cohen, Pontani, Lieberman & Pavane

[57] ABSTRACT

A torque converter having a converter housing which is coupled to a driving unit, a turbine wheel which is arranged in the converter housing and is rotatable with respect to the converter housing about an axis of rotation and has a turbine wheel shell and a turbine wheel hub which is connected with the turbine wheel shell and which can be coupled with or is coupled with a converter driven shaft. A lockup clutch provides selectable rotational coupling of the converter housing with the turbine wheel, and a torsional vibration damper arrangement is provided in the power transmission path between the converter housing and the turbine wheel hub and/or between the turbine wheel shell and the turbine wheel hub. A friction device is connected parallel to the torsional vibration damper arrangement in the power transmission path for generating a frictional force which may be changed in a selected manner.

5 Claims, 3 Drawing Sheets

TORQUE CONVERTER

BACKGROUND OF THE INVENTION

1. Field of the Invention

The present invention relates to torque converters and more particularly to a torque converter having increased vibration damping characteristics in many different operating states.

2. Description of the Related Art

A torque converter is known from DE 195 14 411 A1, wherein a torsional vibration damper is arranged in the connection path between the turbine wheel shell and the turbine wheel hub. A toothing at the shell engages with a counter-toothing at the hub, and provides a rotational play which limits the rotational angle for the torsional vibration damper formed by the engagement of the teeth with one another. Further, a lockup clutch is provided which, in order to transmit power, is coupled to the side of the torsional vibration damper that is also coupled with the turbine wheel shell. That is, the torsional vibration damper is active when the lockup clutch is in its disengaged state and the turbine wheel is rotatably driven during converter operation by work fluid conveyed in the turbine wheel as well as when the lockup clutch is engaged. The turbine wheel shell is therefore coupled with the housing so as to be fixed with respect to rotation relative to it. The operating states in which the torque converter is bridged or bypassed with respect to its converter function by the engagement of the lockup clutch, or in which the lockup clutch is disengaged and transmission of the output torque is accordingly generated by the torque converter, differ considerably with respect to the demands on the torsional vibration damper. In general, the lockup state or bypass state is an operation in which a vehicle drives at a relatively constant speed, that is, at a relatively constant rate of rotation of the internal combustion engine. Generally, in an operating state of this kind, only relatively slight torque variations occur. Thus, when the torsional vibration damper is designed too rigid, these occurring vibrations cannot be damped to the desired extent. However, in the non-bypassed state in which torque conversion occurs, a relatively large torque is transmitted to the converter output shaft by the turbine wheel. This torque must be transmitted through the torsional vibration damper, so that if the torsional vibration damper is designed too soft, it very quickly reaches its limit and can accordingly no longer provide a damping function. Thus, since this known torsional vibration damper works in the bypass state as well as in hydrodynamic operation, i.e., in the torque conversion state, it must, as a rule, have sufficient spring stiffness to prevent the torque converter from reaching its limit at least to a great extent, also in the torque conversion state. As a result, the desired decoupling of vibrations cannot be provided by the torsional vibration damper in the case of smaller transmitted torques or smaller torque variations.

SUMMARY OF THE INVENTION

Therefore, it is the object of the present invention to provide a torque converter in which a good vibration damping characteristic can be provided in many different operating states.

According to the invention, this and other objects are met by a torque converter comprising a converter housing which can be coupled to a driving unit, a turbine wheel which is arranged in the converter housing and is rotatable with respect to the converter housing about an axis of rotation and has a turbine wheel shell and a turbine wheel hub connected with the turbine wheel shell and which can be coupled with or is coupled with a converter driven shaft, a lockup clutch for selectable rotational coupling of the converter housing with the turbine wheel, and a torsional vibration damper arrangement in the power transmission path between the converter housing and the turbine wheel hub and/or between the turbine wheel shell and the turbine wheel hub.

In the torque converter according to the invention, it is further provided that a friction device is connected parallel to the torsional vibration damper arrangement in the power transmission path for generating a frictional force which may be changed in a selected manner.

Depending on the operating state, the torsional vibration damper can be bypassed to a varying extent by suitably adapting the friction force generated in the friction device. Alternatively, a varying proportion of the torque variations introduced into the torsional vibration damper arrangement can be intercepted by generating a friction force. For example, in the bypass state in which only small torque variations are expected, the friction device can be adjusted such that it generates only a relatively small friction force, so that the occurring torque variations are substantially intercepted through the torsional vibration damper arrangement itself. In the torque conversion state, the friction device can be adjusted such that the friction force generated in the friction device is relatively large, and if necessary, sufficiently large to prevent slippage in the friction device, and the torsional vibration damper arrangement is completely bypassed or relieved. This makes it possible, for example, to design the torsional vibration damper arrangement with a relatively soft damping characteristic without the risk that it will quickly reach its limit very in a state in which the torques acting on the torsional vibration damper arrangement are relatively large.

The friction device in the torque converter according to the invention preferably comprises a coupling arrangement having an optionally adjustable engagement force.

In order to realize the parallel connection of the friction device and the torsional vibration damper arrangement, the friction device has a primary side which is fixedly coupled with a primary side of the torsional vibration damper arrangement, and a secondary side which is fixedly coupled with a secondary side of the torsional vibration damper arrangement and which can be brought into an optionally adjustable frictional engagement with the primary side of the friction device.

In an embodiment according to the invention, it can be provided that the torsional vibration damper arrangement is arranged in the connection path between the lockup clutch and the turbine wheel hub, and the turbine wheel shell is connected with the turbine wheel hub so as to be substantially fixed with respect to rotation relative to the turbine wheel hub.

In accordance with one of the embodiments, the torsional vibration damper arrangement connects the lockup clutch to the turbine wheel shell and the turbine wheel shell is then fixedly connected with the turbine wheel hub. In another embodiment, the torsional vibration damper arrangement connects the lockup clutch directly to the turbine wheel hub and, parallel thereto, the turbine wheel shell is connected with the turbine wheel hub so as to be fixed with respect to rotation of the turbine wheel hub.

In an alternative embodiment, the torsional vibration damper arrangement is arranged in the connection path between the turbine wheel shell and the turbine wheel hub.

When it is further provided that the lockup clutch communicates with that side of the primary side and secondary side of the torsional vibration damper arrangement or friction device, respectively, that is connected with the turbine wheel shell so as to be fixed with respect to rotation relative to it, the torsional vibration damper arrangement can be active in the bypass state as well as in the torque conversion state.

According to a further embodiment, a double-acting coupling element which forms a part of the lockup clutch as well as part of the friction device is preferably provided in the torque converter. This element prevents a substantial increase in the number of parts in the torque converter while providing the desired coupling functions and vibration damping function.

In this respect, the arrangement can be constructed such that the double-acting coupling element is coupled with the turbine wheel shell so as to be fixed against rotation relative to it and has a friction arrangement which can optionally be brought into frictional engagement with a first counter-friction arrangement at the converter housing and/or with a second counter-friction arrangement at the turbine wheel hub or with a component which is fixedly coupled with the latter. One side of the primary side and secondary side of the torsional vibration damper arrangement is connected with the double-acting coupling element so as to be fixed against rotation relative to it and the other side of the primary side and secondary side of the torsional vibration damper arrangement is connected with the turbine wheel hub so as to be fixed against rotation relative to it.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
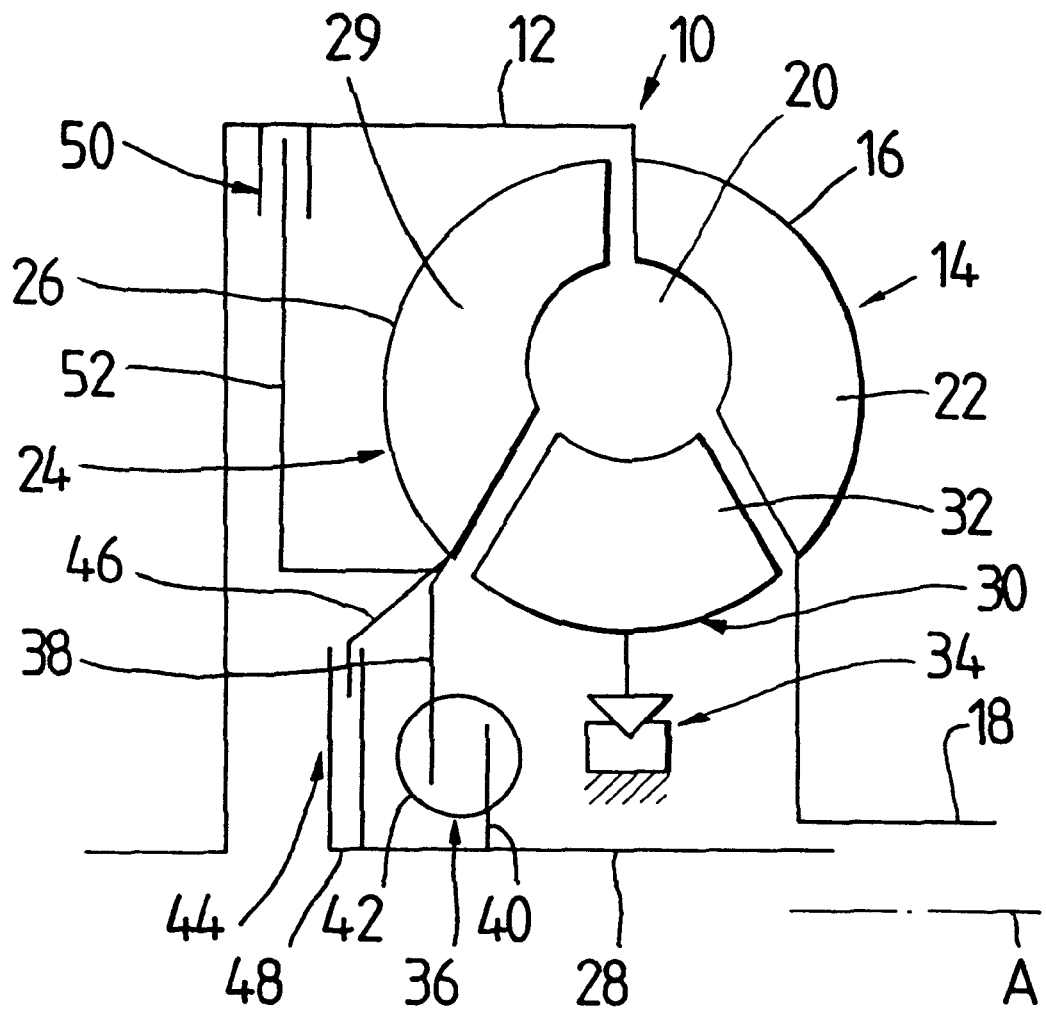
FIG. 1 a simplified partial longitudinal schematic section of a torque converter according to an embodiment of the invention.

FIG. 1 is a schematic view of a torque converter 10 according to the invention. The converter 10 comprises a housing 12 which carries an impeller wheel generally designated by 14. The impeller wheel 4 is substantially formed by an impeller wheel shell 16 and an impeller wheel hub 18 connected with the impeller wheel shell 16 at the radial inside so as to be fixed against rotation relative to it. In a known manner, the impeller wheel hub 18 drives a fluid pump by which a work fluid can be delivered to the interior 20 of the torque converter 10. Further, the impeller wheel shell 16 has a plurality of impeller vanes 22 by which the work fluid contained in the interior 20 of the converter is conveyed in the direction of a turbine wheel 24 which is likewise arranged in the interior of the converter. The turbine wheel 24 also has a turbine wheel shell 26 which is coupled with a turbine wheel hub 28 in the manner described hereinafter. The turbine wheel 24 likewise has a plurality of turbine wheel vanes 29. The turbine wheel hub 28 can be connected with an output shaft of the torque converter, for example, a transmission input shaft, so as to be fixed against rotation relative to it. The turbine wheel 24 is arranged in the converter interior 20 so as to be rotatable about an axis of rotation A with respect to the housing 12.

A stator wheel 30 with a plurality of stator wheel vanes 32 is arranged between the impeller wheel 14 and the turbine wheel 24. The stator wheel 30 is rotatably mounted on a supporting shaft or hub, not shown, via a freewheel 34.

A torsional vibration damper, designated generally by 36, is arranged in the connection path between the turbine wheel shell 26 and the turbine wheel hub 28. A primary side 38 of the torsional vibration damper 36 is connected with the turbine wheel shell 26 so as to be fixed with respect to rotation relative to it and a secondary side 40 of the torque converter 36 is connected with the turbine wheel hub 28 so as to be fixed with respect to rotation relative to it. A damping spring arrangement 42 acts, in a manner known per se, between the primary side 38 and the secondary side 40 of the torque converter 36.

Further, a coupling arrangement 44 is provided parallel to the torsional vibration damper 36 in the connection path between the turbine wheel shell 26 and the turbine wheel hub 28. A primary side 46 of the coupling arrangement 44 is connected with the turbine wheel shell 26 so as to be fixed with respect to rotation relative to it and is therefore also connected with the primary side 38 of the torsional vibration damper 36 so as to be fixed with respect to rotation relative to it. A secondary side 48 of the coupling arrangement 44 is connected with the turbine wheel hub 28, and therefore with the secondary side 40 of the torsional vibration damper 36, so as to be fixed with respect to rotation relative thereto. As will be described in more detail hereinafter with reference to FIG. 2, the engagement force of the coupling arrangement 44 can be changed as desired, so that the coupling arrangement 44 is either in a fully released disengaged state, or in an engaged state which essentially completely bypasses the torsional vibration damper 36 and in which slip between the primary side 46 and the secondary side 48 is not possible, or in an intermediate state in which a predetermined adjustable slip between the primary side 46 and the secondary side 48 is possible and a portion of the torque variations to be transmitted between the turbine wheel shell 26 and the turbine wheel hub 28 is dissipated by friction force and friction heat generated in the area of the coupling arrangement 44.

FIG. 1 further shows that a lockup clutch 50 is provided in the torque converter 10, wherein the turbine wheel 24 can be coupled to the housing 12 so as to be fixed with respect to rotation relative to it or with a determined slip, as required, by means of lockup clutch 50. A coupling element, for example, a clutch piston 52 of the lockup clutch 50 is coupled to the primary side 38 of the torsional vibration damper 36 and accordingly to the primary side 46 of the coupling arrangement 44 and turbine wheel shell 26 so as to be fixed with respect to rotation relative thereto.

The torque converter 10 described above has the following functional characteristics: In a normal operating state in which the torque converter 10 provides a torque conversion function, the impeller wheel 14 delivers fluid to the turbine wheel 24, the lockup clutch 50 is in its disengaged state, and the turbine wheel shell 26 transmits torque to the turbine wheel hub 28 which is clearly higher, e.g., by a factor of 2, than the torque transmitted by an internal combustion engine to the converter housing 12 and accordingly to the impeller wheel 14. As a result of a torque of this magnitude, for example, during vehicle acceleration, the damping springs 42 of the torsional vibration damper 36 would be almost completely compressed and the torsional vibration damper 36 would accordingly reach a limit. In order to prevent this, the coupling arrangement 44 can be engaged or partially engaged in this torque conversion state, so that a bypassing or at least a relieving of the torsional vibration damper 36 is provided through the parallel connection of the torsional vibration damper 36 and the coupling arrangement 44.

In the bypass state in which the lockup clutch 50 is engaged and a torque increase is not provided by the converter 10, the torque to be transmitted through the torque converter 10 is relatively small. Also, the rotational vibrations to be expected in an operating state such as this are only relatively small, so that no overloading of the torsional vibration damper 36 is expected. In this state, the coupling arrangement 44 can be brought into its disengaged state or almost into its disengaged state, so that the vibration damping function is provided essentially entirely by the torsional vibration damper 36 and no vibrational energy is dissipated by the generation of friction force and heat in the area of the coupling arrangement 44.

As a result of this type of construction and principle of operation of the torque converter 10, the torsional vibration damper 36 can be adapted with respect to its damping characteristics primarily to the requirements occurring in the bypass state. In the torque conversion state, it can be ensured through the engagement or partial engagement of the coupling arrangement 44 that the torsional vibration damper 36 which, in itself, is too soft for this operating state is not overloaded. Therefore, the vibration damping behavior in the area of the torque converter 10 can be optionally adapted to the occurring torque for both of the operating states mentioned above through appropriate control of the coupling arrangement 44 (i.e., through appropriate adjustment of the engagement force of coupling arrangement 44). Nevertheless, the advantage of providing a torsional vibration damper between the turbine wheel shell and the turbine wheel hub with the resulting small secondary mass, (i.e., the smallest possible mass in the area of the converter output shaft), is maintained in full. Further, due to the possibility of at least partial bypassing of the torsional vibration damper 36 at least in the torque conversion state, torsional vibration damper 36 can be constructed with a soft damping characteristic while taking up relatively little space.

Figure 2:
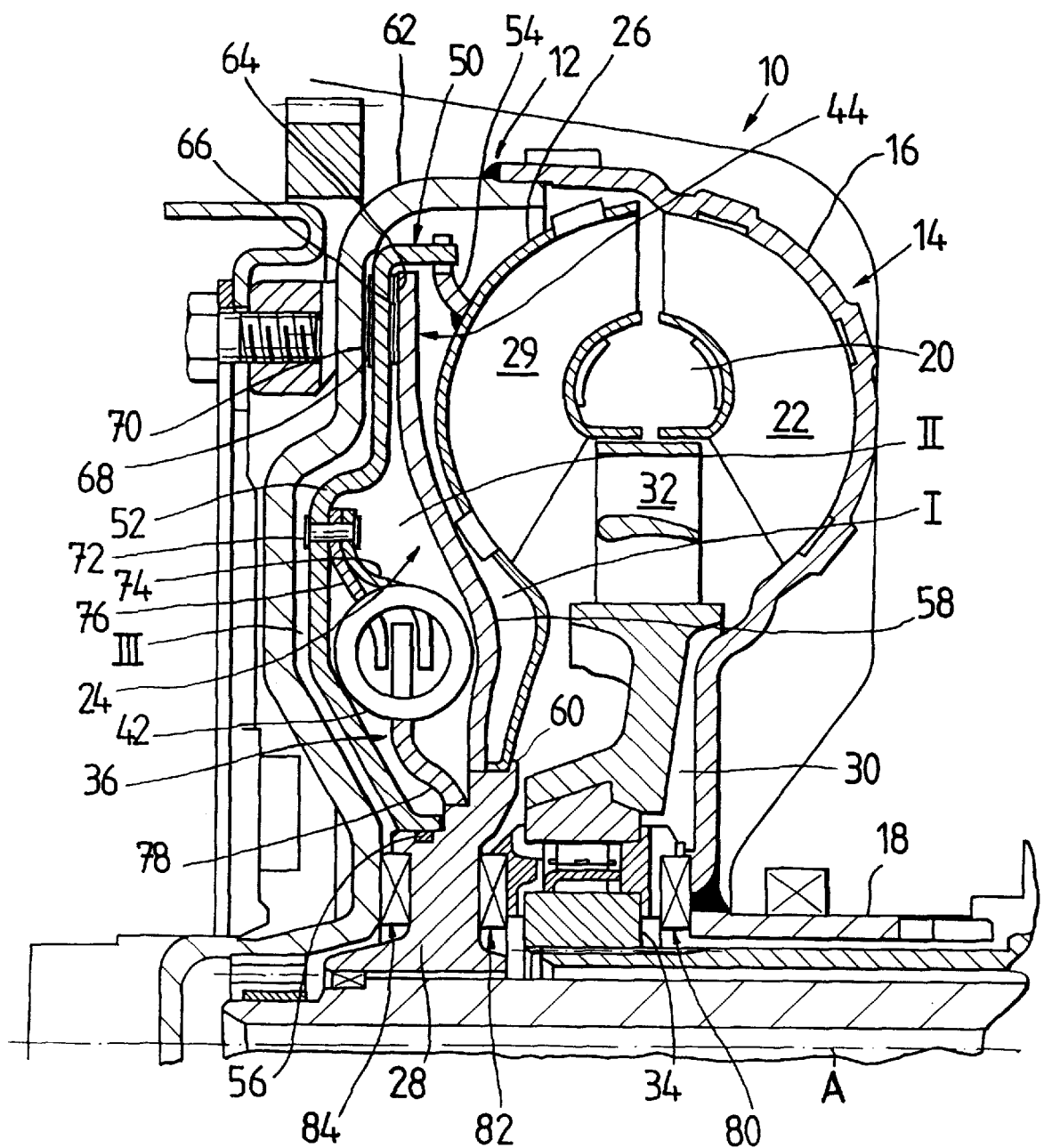
FIG. 2 is a partial longitudinal section through a torque converter according to an embodiment of the invention illustrating the principles of operation shown in FIG. 1.

FIG. 2 shows an embodiment of a torque converter in which the functional features described with reference to FIG. 1 are realized. Components corresponding to the components described with reference to FIG. 1 are designated by the same reference numbers.

The lockup clutch 50 which can be seen in the torque converter 10 has a clutch piston 52 which is connected in its radial outer area with a connection element 54 so as to be fixed with respect to rotation relative to it. The connection element 54 is fastened to the turbine wheel shell 26. Therefore, a fixed rotational coupling is achieved between the turbine wheel shell 26 and the clutch piston 52. In its radial inner area, the clutch piston 52 is rotatably mounted on the turbine wheel hub 28 so as to be sealed by an O-ring 56. In a corresponding manner, the turbine wheel shell 26 is rotatably mounted in its radial inner area on the turbine wheel hub 28. The turbine wheel shell 26 is held in the axial direction between a coupling element 58 fixed to the turbine wheel hub 28, e.g., by means of welding, and a radial shoulder 60 of the turbine wheel hub 28. Friction arrangements, for example, friction surfaces 64, 66, 68, 70, which are located opposite one another are provided at the clutch piston 52, the coupling element 58 and the housing 12, i.e., at a cover 62 of the latter. In this respect, the friction surfaces 64, 66 can be made to contact the coupling element 58 and the clutch piston 52 on the one hand and the oppositely located friction surfaces 68, 70 can be made to contact the clutch piston 52 and the housing 12 on the other hand in a manner which will be described hereinafter.

Further, the primary side (38 in FIG. 1) of the torsional vibration damper 36, i.e., the cover disk elements 74, 76, are connected with the clutch piston 52 by rivet bolts 72 or the like so as to be fixed with respect to rotation relative thereto. A hub disk 78 forming the secondary side (40 in FIG. 1) of the torsional vibration damper 36 is fixed to the turbine wheel hub 28, for example, by welding. In a manner known per se, the cover disk elements 74, 76 and the hub disk 78 have spring windows with control edges at which the damping springs 42 can be supported in the circumferential direction, so that the cover disk elements 74, 76 can be rotated in the circumferential direction with respect to the hub disk 78 accompanied by compression of the damping springs 42.

It can be seen in FIG. 2 that the torsional vibration damper 36 is arranged in the connection path between the turbine wheel shell 26 and the turbine wheel hub 28. This means that when the lockup clutch 50 is disengaged and the coupling arrangement 44 is disengaged, the rotational coupling of the turbine wheel shell 26 to the turbine wheel hub 28 is provided only by the clutch piston 52 and the torsional vibration damper 36. When the lockup clutch 50 is disengaged and the coupling arrangement 44 is engaged, the rotational connection between the turbine wheel shell 26 and the turbine wheel hub 28 is provided by the clutch piston 52 coupled to the turbine wheel shell 26 and by the coupling element 58 in a frictional engagement with the turbine wheel shell 26. Accordingly, it can be seen that the coupling arrangement 44 lies parallel to the torsional vibration damper 36 in the power transmission path and, in its engaged state, bridges or bypasses the torsional vibration damper 36. When the lockup clutch 50 is engaged and the coupling arrangement 44 is disengaged, a rotational connection is formed between the housing 12 and the turbine wheel hub 28 by the clutch piston 52 which is in frictional engagement with the housing 12 and the torsional vibration damper 36 which connects the clutch piston 52 with the turbine wheel hub 28 for rotation. When the lockup clutch 50 is engaged and the coupling arrangement 44 is engaged, a bypassing of the torsional vibration damper 36 is again provided by the coupling element 58 which is in a frictional engagement with the clutch piston 52.

The manner in which the lockup clutch 50 and coupling arrangement 44 are controlled will be described hereinafter. It can be seen from FIG. 2 that essentially three fluid spaces are formed in the interior of the torque converter 10. One fluid space I is formed in the area between the coupling element 58 and the turbine wheel shell 26 and substantially communicates with the interior 20 of the converter for a free exchange of fluid. A second fluid space II is formed between the coupling element 58 and the clutch piston 52 and is sealed on the radial inside by the weld connection of the coupling element 58 and the sealing of the O-ring with respect to the turbine wheel hub 28. On the radial outside, fluid space II is closed by the closely contacting friction surfaces 64, 66. A third fluid space III is formed between the clutch piston 52 and the cover 62 of the converter housing. In this case also, the closely contacting friction surfaces 68, 70 form a closure on the radial outside of that fluid space III. Each of the three fluid spaces I, II and III communicates, via corresponding fluid supply passages, with a fluid pressure source associated with the respective fluid spaces. This fluid pressure source can be formed by a shared fluid pump which supplies a desired pressure to the individual fluid spaces via separately controllable valves. In the same way, it is possible to provide a separate fluid pressure pump for each of the fluid pressure spaces. The fluid feed line to fluid space I can be provided, for example, in the area of axial bearings 80, 82, the fluid feed to fluid space III can be provided, for example, in the area of an axial bearing 84, and the fluid feed to fluid space II can be provided, for example, by a passage, not shown in the Figures, which penetrates the turbine wheel hub 28. Accordingly, the fluid pressure prevailing in the individual fluid spaces I, II and III can be adjusted independently from the fluid pressure prevailing in the other spaces.

When the torque converter is to be set in its converter operating state, i.e., when the lockup clutch 50 is disengaged and the coupling arrangement 44 is also moved into its disengaged state, the pressure in fluid space III is adjusted such that it is greater than the pressure prevailing in fluid space I. The pressure prevailing in fluid space II is also adjusted such that it is greater than the pressure prevailing in fluid space I. The clutch piston 52 is then pressed toward the right with reference to the view in FIG. 2 in order to separate the friction surfaces 68, 70 from one another and, in a corresponding manner, the elastically deformable coupling element 58 is pressed toward the right with reference to the view in FIG. 2 in order to separate friction surfaces 64, 66 from one another. A rotational coupling of the turbine wheel shell 26 to the turbine wheel hub 28 is then provided only via the torsional vibration damper 36. If the torsional vibration damper 36 is to be relieved (i.e., partially bypassed) in torque converter operation due to the relatively large occurring torques, so that a part of the occurring torque variations or changes is dissipated in friction work or is conducted to the turbine wheel hub 28 via the coupling arrangement 44, the pressure in fluid space II can be reduced until the pressure prevailing in fluid space I is sufficient to press the coupling element 58 with its friction surface 64 against the friction surface 66 at the clutch piston 52. Depending on the adjustment of the two pressures, the frictional force generated in the area of the friction surfaces 64, 66 and the frictionally engaging coupling can be adjusted such that a defined slip is made possible between these two friction surfaces during the occurrence of torque or such that a completely engaged coupling state of the coupling arrangement 44 is generated, wherein the torsional vibration damper 36 is completely bypassed by the coupling arrangement 44.

If the bypass state of the converter is to be produced and the coupling arrangement 44 is to be maintained in its disengaged state at the same time, the pressure in fluid space III is gradually reduced and/or the pressure in fluid space I is gradually increased proceeding from the state in which both couplings 50 and 54 were disengaged while the pressure in fluid space II is maintained. The clutch piston 52 and the coupling element 58 then move toward the left with reference to the view in FIG. 2 as a result of the prevailing pressure in fluid space I which is higher than that in fluid space III, so that the friction surfaces 68, 70 contact one another, but friction surfaces 64, 66 are still separated from one another. The lockup clutch is engaged to a varying degree of strength depending on the magnitude of the adjusted pressure difference, so that either a non-slip, completely engaged state of the lockup clutch is produced or a defined slip is allowed in the torque converter. In this operating state, the torsional vibration damper 36 is provided solely for coupling the housing 12 to the turbine wheel hub 28, and the rotational fluctuations occurring in the drivetrain can then be intercepted in this torsional vibration damper 36. In order to prevent overloading of the torsional vibration damper 36 in the bypass state of the torque converter 10 as a result of anticipated relatively large rotational vibrations, the coupling arrangement 44 can be at least partially engaged again by lowering the pressure in fluid space II, so that at least a portion of the occurring rotational vibrations is dissipated by friction energy and by thermal energy that is generated accordingly. If the fluid pressure in fluid space I is maintained, the engagement state of lockup clutch 50 remains unchanged. If the fluid pressure in fluid space I is increased, the engagement force of the lockup clutch 50 is also increased in addition to the engagement of the coupling arrangement 44.

It will be seen that any desired state of the coupling connection between the converter housing 12 and the clutch piston 52 on the one hand and between the clutch piston 52 and coupling element 58 on the other hand can be generated by means of a suitable change in the fluid pressures in the fluid spaces I, II and III. Therefore, the torque converter 10 can be adjusted such that, depending on the existing operating or driving states, it can provide the optimum vibration damping function for the respective states. Further, it is possible to adjust the damping characteristic of the springs 42 of the torsional vibration damper 36 such that they have a relatively soft spring characteristic adapted to the bypass state of the torque converter 10. Thus, when larger torques or torque fluctuations occur, a portion of the occurring vibrational energy can be converted into friction work and therefore into thermal energy as the engagement of the coupling arrangement 44 increases or the torsional vibration damper 36 can be completely bypassed.

Figure 3:
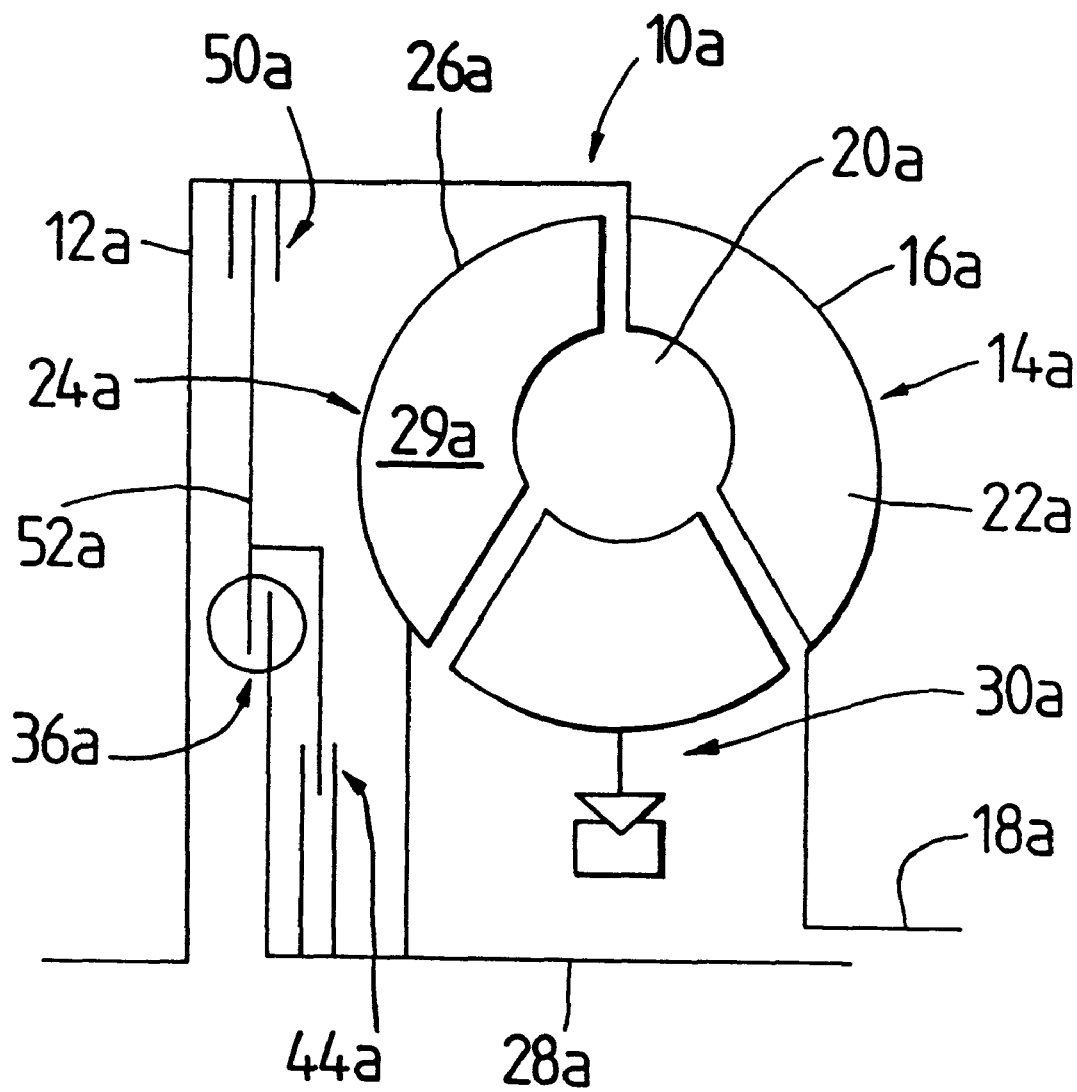
FIG. 3 is another simplified partial longitudinal section of a torque converter according to an alternative embodiment of the invention.

FIG. 3 shows a modified embodiment according to the invention. Components corresponding to the above-described components are designated by the same reference numbers with the addition of the letter "a".

FIG. 3 shows that the torsional vibration damper 36a in this case is arranged in the direct connection path between the housing 12a and the turbine wheel hub 28a. In addition, the coupling arrangement 44a is arranged in the connection path between the clutch piston 52a and the turbine wheel hub 28a. In this case, the turbine wheel shell 26a is connected with the turbine wheel hub 28a so as to be fixed with respect to rotation relative to it. In this embodiment, the torsional vibration damper 36a can be bypassed to a greater or lesser extent in a controlled manner by optional adjustment of the engagement force of the coupling arrangement 44a. However, in this embodiment, the torsional vibration damper 36a is only active when the lockup clutch 52a is also at least partially engaged. A torsional vibration damper acting between the turbine wheel shell 26a and the turbine wheel hub 28a is not provided in this case. In this arrangement, the connection path leading over the torsional vibration damper 36a and coupling arrangement 44a could likewise go from the housing 12a to the turbine wheel shell 26a. Since the latter is connected with the turbine wheel hub 28a so as to be fixed with respect to rotation relative to it, the same functional features as those shown in FIG. 3 are provided.

In the torque converter according to the invention, the coupling arrangement 44 or 44a and the lockup clutch 50 or 50a can be formed by any suitable type of coupling. Thus, it is possible to use any type of multiple-disk clutch system in this case. It is also possible to provide, in the area of these surfaces provided for mutual frictional contact, a friction element on at least one of the respective surfaces so as to enable adjustment of the generated friction force in a defined manner. The two couplings provided in the respective torque converters can be constructed such that they are independently controllable from one another or can be constructed such that they are connected with one another with respect to action or switching, so that when one of the couplings is engaged the other is disengaged, and vice versa. For example, when the coupling element 58 in the embodiment according to FIG. 2 is constructed as a rigid part, a switching action of the double-acting clutch piston 52 can be generated in that only the pressures in fluid spaces II and III are controlled. That is, if the pressure in fluid space II is higher than the pressure in fluid space III, the lockup clutch is in its engaged state and if the pressure in fluid space III is higher than the pressure in fluid space II then the coupling arrangement 44 is in its engaged state.

The invention is not limited by the embodiments described above which are presented as examples only but can be modified in various ways within the scope of protection defined by the appended patent claims.

I claim:

1. A torque converter having a converter housing connectable to a driving unit, a turbine wheel arranged within the converter housing and being rotatable about an axis of rotation, the turbine wheel having a turbine wheel shell and a turbine wheel hub connected to the turbine wheel shell, the turbine wheel hub being connectable to a converter driven shaft, the torque converter having a lockup clutch enabling selective rotational coupling of the converter housing with the turbine wheel and a torsional vibration damper arrangement in a power transmission path between the converter housing and the turbine wheel hub and between the turbine wheel shell and the turbine wheel hub, said torque converter comprising:

a friction device connected in the power transmission path parallel to the torsional vibration damper and generating a selectively changeable frictional force, said friction device comprising a primary side fixedly coupled with a primary side of the torsional vibration damper and a secondary side fixedly coupled with a secondary side of the torsional vibration damper, said secondary side of said friction device being brought into adjustable frictional engagement with said primary side of said friction device.

2. The torque converter in accordance with claim 1, wherein the torsional vibration damper is disposed in the connection path between the lockup clutch and the turbine wheel hub, and the turbine wheel shell is connected with the turbine wheel hub so as to be substantially fixed against rotation relative to it.

3. The torque converter in accordance with claim 1, wherein the torsional vibration damper is arranged in the connection path between the turbine wheel shell and the turbine wheel hub.

4. The torque converter in accordance with claim 3, wherein the lockup clutch is in communication with one of the primary side of the torsional vibration damper and said secondary side of the friction device that is connected with the turbine wheel shell so as to be fixed with respect to rotation relative to it.

5. The torque converter in accordance with claim 1, wherein said clutch piston is coupled to the turbine wheel shell so as to be fixed against rotation relative to the turbine shell, said clutch piston comprising a friction arrangement and wherein the converter housing includes a first counter-friction arrangement and the turbine wheel hub includes a second counter-friction arrangement and a coupling element fixedly coupled to said turbine wheel hub, said friction arrangement of said clutch piston being optionally brought into frictional engagement with one of said first counter-friction arrangement, said second counter-friction arrangement and said coupling element, wherein one of said primary and secondary sides of the torsional vibration damper is connected with said clutch piston so as to be fixed against rotation relative to the torsional vibration damper and the other of said first and secondary sides of the torsional vibration damper is connected with the turbine wheel hub so as to be fixed against rotation relative to it.

* * * * *